United States Patent
Adams et al.

(10) Patent No.: US 7,191,268 B2
(45) Date of Patent: Mar. 13, 2007

(54) COMBINED HOST INTERFACE CONTROLLER FOR CONDUCTING COMMUNICATION BETWEEN A HOST SYSTEM AND MULTIPLE DEVICES IN MULTIPLE PROTOCOLS

(76) Inventors: Lyle E. Adams, 1602 Flower Garden La., San Jose, CA (US) 95124; Andrew Weir, 3301 Keswick Way, West Chester, PA (US) 19382

( * ) Notice: Subject to any disclaimer, the term of this patent is extended or adjusted under 35 U.S.C. 154(b) by 0 days.

(21) Appl. No.: 11/495,346

(22) Filed: Jul. 28, 2006

(65) Prior Publication Data

US 2006/0265531 A1    Nov. 23, 2006

Related U.S. Application Data

(62) Division of application No. 11/015,295, filed on Dec. 17, 2004.

(60) Provisional application No. 60/530,970, filed on Dec. 19, 2003.

(51) Int. Cl.
| | |
|---|---|
| G06F 13/42 | (2006.01) |
| H04M 3/42 | (2006.01) |
| H04M 7/00 | (2006.01) |
| H04Q 3/00 | (2006.01) |

(52) U.S. Cl. .................. 710/105; 710/22; 710/305; 710/315

(58) Field of Classification Search ................ 710/305, 710/315, 316, 105, 22, 11; 711/147, 157; 370/395.5, 402, 466, 257; 709/218, 250, 709/263
See application file for complete search history.

(56) References Cited

U.S. PATENT DOCUMENTS 4,870,704 A * 9/1989 Matelan et al. ............. 710/120

(Continued)

OTHER PUBLICATIONS

"Performance analysis of data transfer protocols over spae communications" by De Cola et al. (abstract only) Publication Date: Oct. 2005.*

(Continued)

*Primary Examiner*—Gopal C. Ray
(74) *Attorney, Agent, or Firm*—Klarquist Sparkman, LLP

(57) ABSTRACT

Described herein are methods and systems for conducting computer system communications with a number of different devices that communicate with the computer system in a number of different protocols via a protocol-shared combination host controller. Combination host controller has a reduced set of pins for handling communication in a plurality of communication protocols. The total number of pins needed for driving communication in a plurality of communication protocols is reduced by sharing at least one control pin or at least one data pin or combination thereof between at least some of the plurality of communication protocols. In one embodiment, data communications in different protocols overlapping in time can be interleaved onto to a shared data path by suspending a current transmission until a later higher priority transmission is complete.

8 Claims, 8 Drawing Sheets

U.S. PATENT DOCUMENTS

| | | | |
|---|---|---|---|
| 5,293,384 A * | 3/1994 | Keeley et al. | 714/55 |
| 5,315,706 A * | 5/1994 | Thomson et al. | 710/105 |
| 5,754,804 A * | 5/1998 | Cheselka et al. | 710/305 |
| 5,797,041 A * | 8/1998 | Yasue et al. | 710/52 |
| 6,104,876 A * | 8/2000 | Daum et al. | 710/37 |
| 6,400,960 B1 * | 6/2002 | Dominique et al. | 455/522 |
| 6,449,263 B2 * | 9/2002 | Harris et al. | 370/316 |
| 6,571,303 B1 * | 5/2003 | Yasue et al. | 710/52 |
| 6,804,756 B2 * | 10/2004 | Pascucci | 711/167 |
| 6,934,898 B1 * | 8/2005 | Goff | 714/727 |
| 7,058,741 B2 * | 6/2006 | Iwata et al. | 710/110 |
| 2005/0246477 A1 * | 11/2005 | Adams et al. | 710/315 |

OTHER PUBLICATIONS

Slye and Elnozahy, "Support for software interrupts in log-based rollback-recovery," *IEEE Transactions on Computers* 47(10):1113-1123, Oct. 1998.

* cited by examiner

US 7,191,268 B2

COMBINED HOST INTERFACE CONTROLLER FOR CONDUCTING COMMUNICATION BETWEEN A HOST SYSTEM AND MULTIPLE DEVICES IN MULTIPLE PROTOCOLS

RELATED APPLICATION DATA

This application is a divisional of U.S. patent application Ser. No. 11/015,295, filed Dec. 17, 2004, entitled "A Combined Host Interface Controller For Conducting Communication Between A Host System And Multiple Devices In Multiple Protocols," the disclosure of which is hereby incorporated by reference, which claims the benefit of U.S. Provisional Application Ser. No. 60/530,970, filed Dec. 19, 2003, which is incorporated by reference herein.

TECHNICAL FIELD

The field relates to computer system communications. More particularly, the field relates to controllers for driving communication between a system and other systems and external devices.

BACKGROUND

In a modern computer system, whether it is a conventional system with physically separate and distinct system components or the more physically integrated system on chip (SOC), multiple protocols can be used to conduct communications between the various components of a single system and other devices external to the system including other systems. The Advanced Technology Attachments (ATA) or Integrated Drive Electronics (IDE as it is sometimes referred to) is one such popular communications protocol that was originally developed to support communication between a host processor of a system and associated storage devices, such as hard disk drives (HD) and CD-ROM drives, for instance. The ATA protocol has now evolved to include a serial communications protocol (referred to as a Serial ATA), as well as the original parallel ATA communications protocol. Other such communication protocols include SCSI, USB, ADB, RS-232, RS-485, HPPI, IEEE-488, PCMCIA and SSA to name just a few. The PCMCIA protocol is popularly used with memory devices commonly referred to as a PC card or a version specially suited for laptop computers that is sometimes referred to as an Express card.

Despite the numerous communication protocols already in place, new protocols continue to proliferate the field. Therefore, a modern computer system should be flexible enough to accommodate the capability to communicate in a number of different communication protocols. However, the addition of the capability to communicate in each new protocol can bring in additional complexities and require additional system resources to implement a system design. Such additional complexities may interfere with other goals of a system design such as reducing the pin count in an SOC or a discrete system. Thus, there is a need to provide a flexible and extensible system design to which capability to conduct communications in a plurality of communication protocols can be added without significantly increasing the associated resource costs (e.g., increased pin count or increased foot print area of an SOC).

SUMMARY

Described herein are methods and systems for conducting computer system communications between a host system and external devices in a plurality of communication protocols. The exemplary combination host controller is adapted to conduct communication between a system and other devices in a plurality of communication protocols over communication pins that are shared between at least some of the plurality of the protocols.

In one aspect, the combination host controller is adapted to interleave data-related communication associated with the different protocols onto a shared data path. In a further aspect, the combination host controller comprises at least one communication pin shared for use in transmitting at least some of the control-related communication in at least some of the plurality of communication protocols.

Thus, shared communication pins used for transferring communication between a system and associated devices in a plurality of communication protocols yields an exemplary combination controller as described herein with fewer pins than if individual protocol-specific host controllers are used for conducting communication in each different protocol.

In one embodiment, the exemplary combination host controller comprises an access control module, a state machine, mode control module and a data path controller. The access control module is programmed to determine a type of protocol associated with particular system communication. At least based on which type of protocol, the state machine is programmed to interleave the transfer of a first data-related communication in a first protocol in between the transferring of an active lower priority data-related transfer of a second communication in a second protocol. In one embodiment, the mode control module configures and drives the control-related communication wherein, at least some of the control-related signals are transmitted via at least one control pin shared between a plurality of different communication protocols.

In a further aspect, one embodiment of the combination host controller is capable of conducting communication in several different protocols including, but not limited to, IDE, PCMCIA and GPIO. Other protocols can be used as well. Additional aspects and advantages will become apparent from the following detailed description of illustrated embodiments, which proceeds with reference to accompanying drawings.

DETAILED DESCRIPTION

Figure 1:
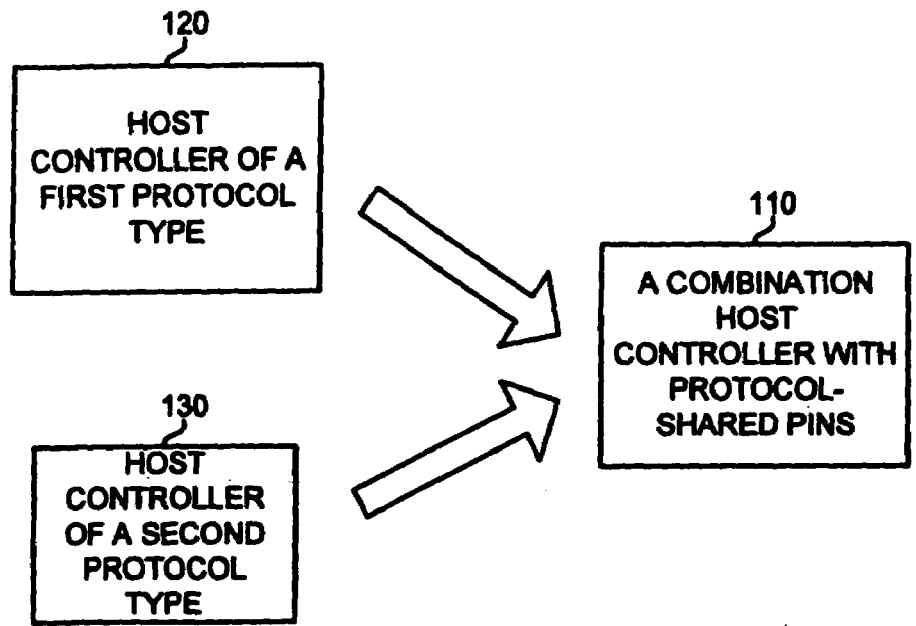
FIG. 1 is a block diagram illustrating a method to implement a combination host controller to conduct computer system communication with multiple external devices using multiple different protocols.

An Exemplary Overall Description of a Protocol-Shared Combination Host Controller As newer communication protocols proliferate, it becomes increasingly important to combine the functionality of system resources needed to support the various protocols. FIG. 1 illustrates one exemplary method of combining system resources needed to implement the capability to conduct computer system communications in several protocols with several devices. As shown in FIG. 1, a combination host controller 110 capable of conducting communication in several different communication protocols between several different devices is implemented by combining the hardware, the software, and other resources of a plurality of host controllers (e.g., 120 and 130) that are specific to a particular communication protocol within one host controller entity.

An Exemplary Overall Concept for a Combination PCMCIA/IDE Host Controller

Figure 2:
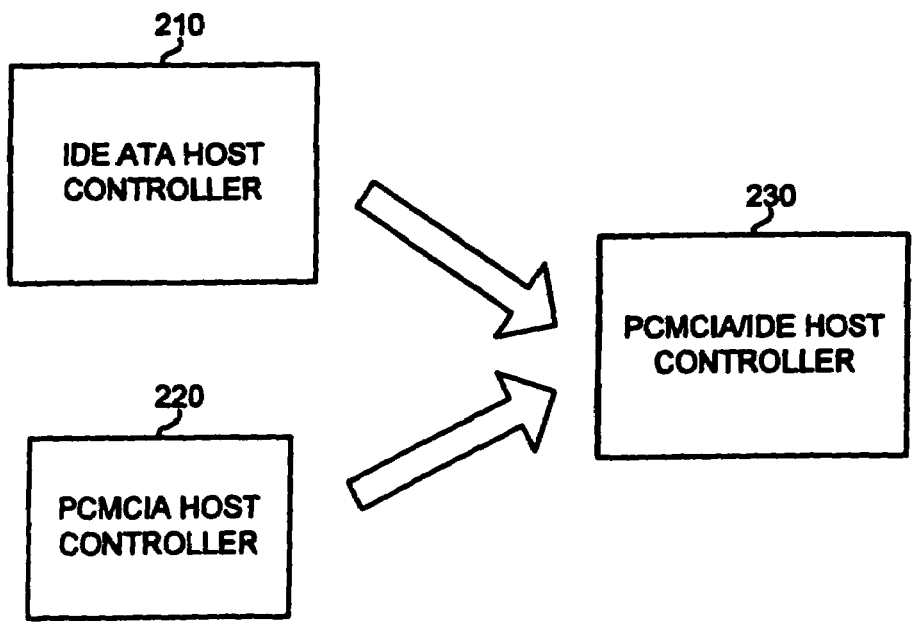
FIG. 2 is a block diagram illustrating one exemplary embodiment of the method of implementing a combination PCMCIA/IDE host controller.

FIG. 2 illustrates an exemplary combination host controller wherein, a protocol-specific IDE/ATA host controller 210 and a protocol-specific PCMCIA host controller 220 are combined to yield a protocol-shared combination PCMCIA/IDE host controller 230 with the ability to conduct communication in both IDE and PCMCIA protocols. Similarly, other combinations are possible. For instance, two other protocol-specific host controllers for two other types of protocols can be combined. Also, a combination host controller capable of conducting communication in more than two different protocols can be implemented.

A combination host controller, such as the ones described above with reference to FIGS. 1 and 2 can be implemented as part of an SOC or as a discrete physical entity in communication with the rest of the system and other devices connected to the system. Nevertheless, combining the functionality of several protocol-specific host controllers into one combination host controller entity with the ability to conduct communication in a number of different communication protocols reduces the resources needed to implement a system capable of handling multiple communication protocols. For instance, such a combination host controller capable of conducting communication in a number of different communication protocols requires a fewer number of communication pins to transmit control, data, and other signals related to the system communication in comparison to an implementation having independent protocol-specific host controllers for each different communication protocol type.

Figure 3:
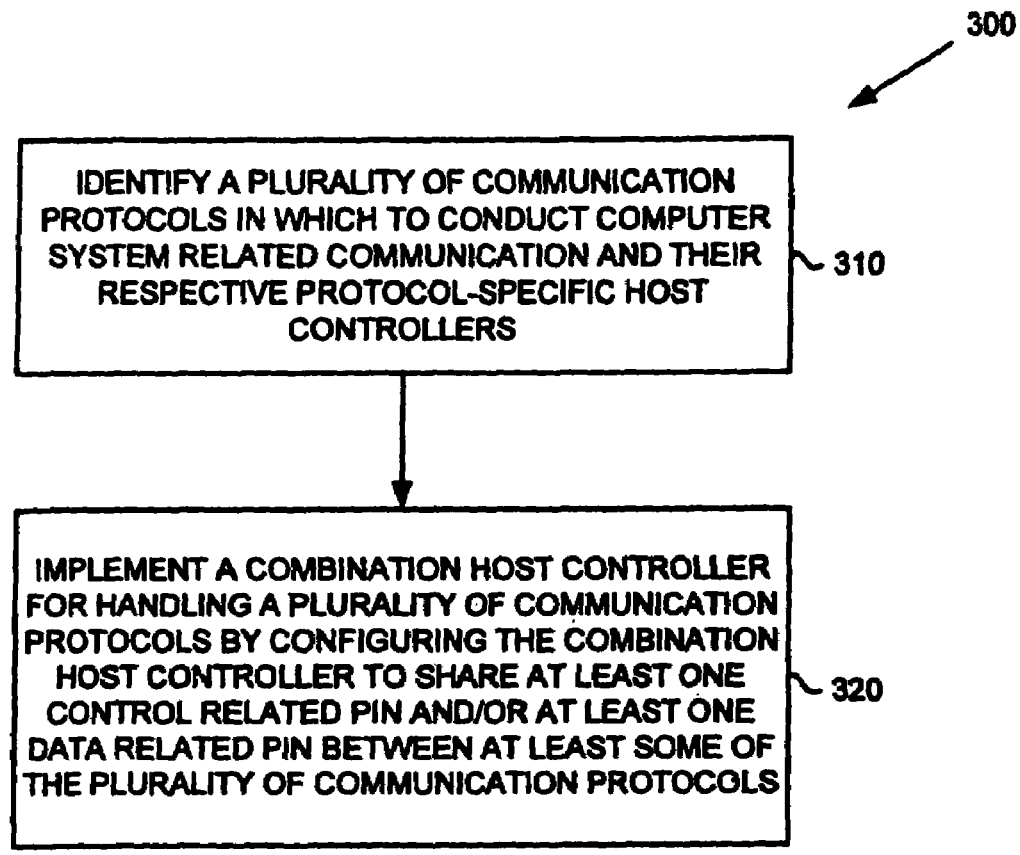
FIG. 3 is a flow diagram describing an exemplary overall method to implement a protocol-shared combination host controller capable of conducting computer system communication with a number of different devices in a number of different communication protocols.

An Exemplary Overall Method for Implementing a Protocol-Shared Combination Host Controller FIG. 3 illustrates one exemplary method 300 for implementing a combination protocol-shared host controller. At 310, a plurality of communication protocols in which to conduct computer system communications and their respective protocol-specific host controllers are identified. Then at 320, a protocol-shared combination host controller is implemented by configuring the combination host controller to share at least one control-related pin and/or at least one data-related pin for transmitting control signals and/or data signals in a plurality of communication protocols. The number of pins needed to implement a system capable of conducting communication in multiple different protocols can be reduced by sharing the pins for conducting signals of different protocols. Reducing pin counts can result in significant reductions in cost of implementing a system. In fact, a single reduction in pin count can result in huge cost savings over a large number of systems. Thus, sharing even a single control pin or a single data pin between a plurality of different protocols can be advantageous.

Exemplary Protocol-Shared Combination Host Controller Core

Figure 4:
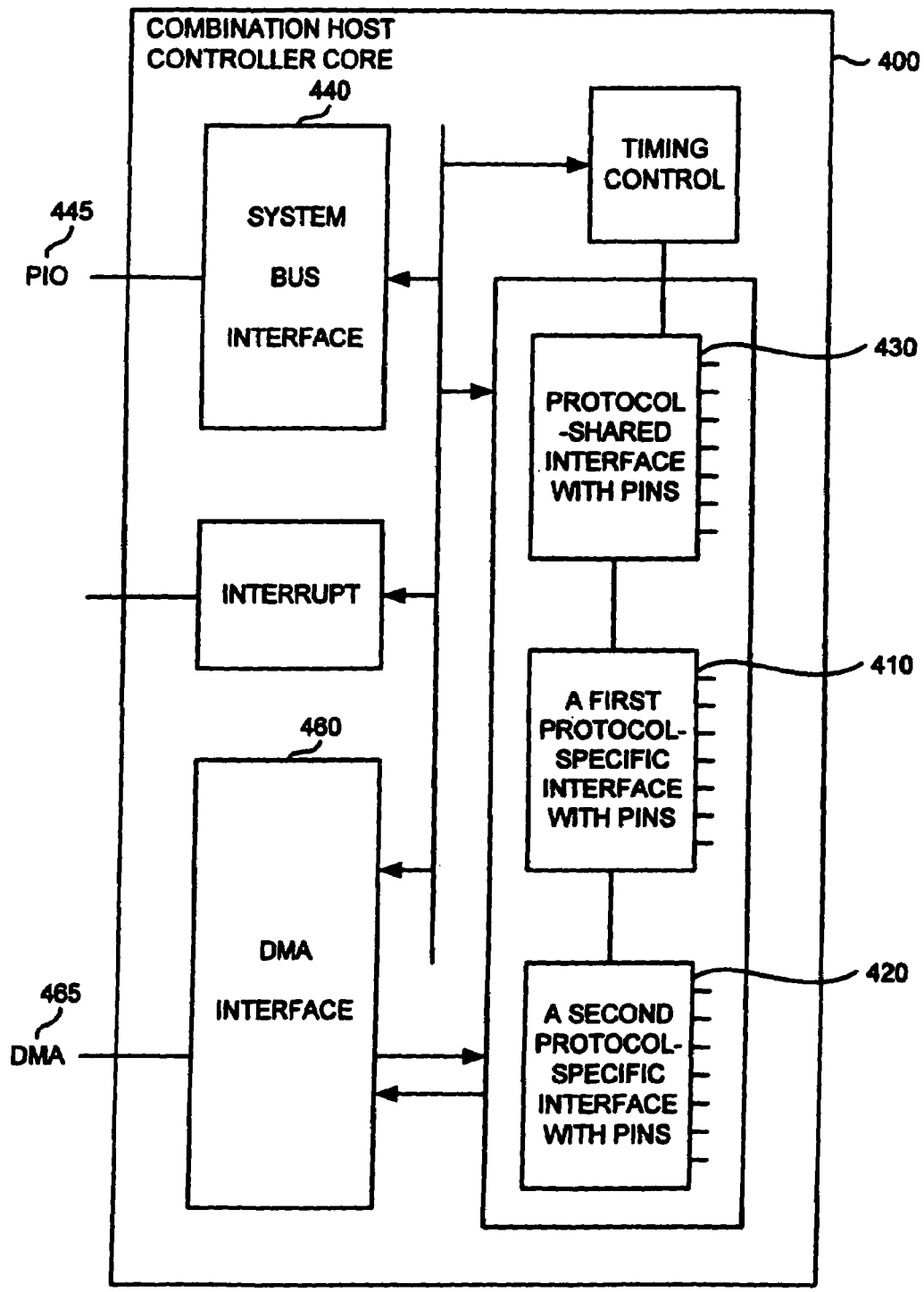
FIG. 4 is a block diagram of a conceptual protocol-shared combination host controller core capable of conducting computer system communication with a number of different devices in a number of different communication protocols.

FIG. 4 illustrates one exemplary combination host controller core 400 capable of conducting communication between a system and external devices including other systems. Such a core can be implemented as part of an SOC or a discrete entity outside the SOC, or a conventional general-purpose computer system. As shown in FIG. 4, the exemplary embodiment of a protocol-shared combination host controller core comprises a first protocol-specific host controller interface to external devices 410 and a second protocol-specific host controller interface to external devices 420. In this embodiment, each of the protocol-specific host controller interfaces (410 and 420) comprise of pins dedicated to transmit signals in a single protocol. However, the core 400 also comprises a shared controller interface 430 which comprises of at least one pin for transmitting signals common to both the first and second protocol. The shared signals can be control signals, data signals, or some combination thereof.

Also, as shown in FIG. 4, the exemplary combination host controller core is capable of conducting host processor initiated programmed input output (PIO) related communications at 445 comprising data and control-related signals via the system bus interface (e.g., AHB or AMBA) 440, as well as data-related Direct Memory Access (DMA) signals at 465 via a DMA interface 460.

An Exemplary PCMCIA/IDE/GPIO Combination Host Controller Core

Figure 5:
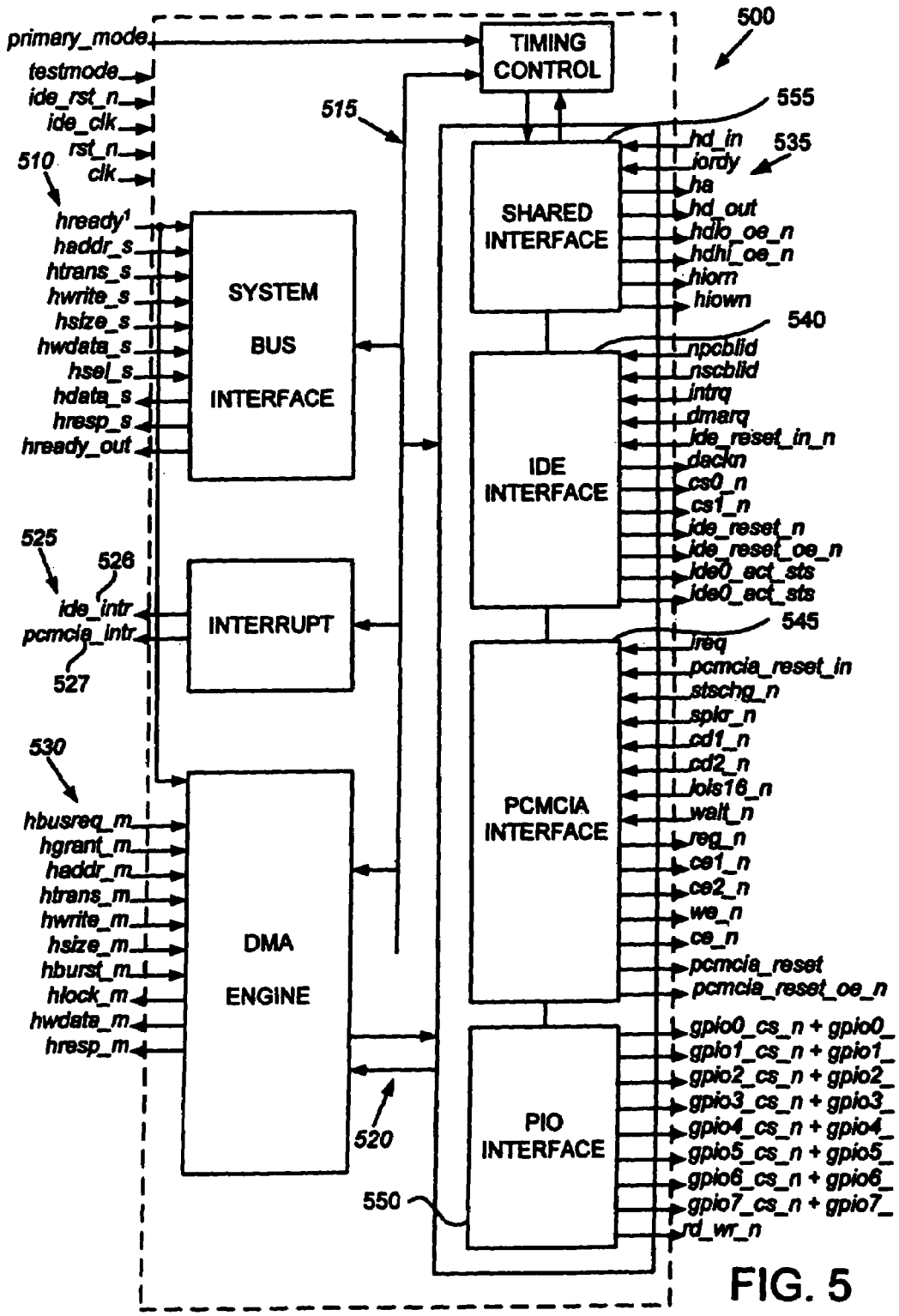
FIG. 5 is a block diagram illustrating a PCMCIA/IDE/GPIO protocol-shared combination host controller core capable of conducting computer system communication with a number of different devices in PCMCIA, IDE and GPIO communication protocols.

FIG. 5 illustrates an exemplary implementation of the concepts described above with respect to FIGS. 1–4. FIG. 5 conceptually illustrates a combination PCMCIA/IDE/GPIO host controller core 500 with protocol-specific interface pins (540, 545 and 550) and a set of interface pins shared between the PCMCIA, IDE, and GPIO based signals 555. The IDE/PCMCIA/GPIO controller 500 integrates into the on-chip system via an AHB Slave port 510 for access to internal registers and PIO access 515 to external devices, and an AHB Master port 530 for IDE-DMA data transfer 520. Two interrupts 525 are provided, allowing for independent software interrupt service routines, one for IDE 526 and one for PCMCIA 527. The core interfaces to external devices through I/O cells 535. For instance, the core 500 can support simultaneous system operation of two IDE devices (e.g., a master and a slave), one PCMCIA card, and four onboard chips accessed via GPIO cycles.

This controller 500 interfaces to the host processor through the AHB interface 510 on one end, and the IDE/ATA interface 540, PCMCIA interface 545, GPIO interface 550 and the shared interface 555 on the other end. In one embodiment, pins are shared between multiple communication protocols by fanning out address, data, I/O strobes, and the wait signal to all connectors and chips, as shown with reference to the shared interface sub-module 555. Other signals are dedicated for each protocol-specific interface. This exemplary supports multi-word DMA and Ultra DMA data transfers between external IDE devices and the AHB interface. The IDE timing and control registers in this core are compatible with the Intel register set in the PIIX family. This core has a full scatter gather DMA capability, which is compatible with Intel scatter gather DMA function on the PIIX chipset. A DMA engine is used only for IDE transfers. GPIO and PCMCIA accesses are via PIO.

The IDE Interface sub-module at 540 is capable of PIO and DMA transfers. This sub-module handles all timing of IDE signals for PIO and DMA accesses. The actual IDE registers are implemented in the attached devices. Input signals from IDE devices, such as dmarq, iordy, and intrq are synchronized inside the IDE interface sub-module 540.

The PCMCIA Interface sub-module at 545 initiates attribute memory, common memory, and I/O read-write cycles to external PCMCIA/PC card devices, among other things. The GPIO Interface sub-module at 550 can be used to issue I/O write-read cycles to additional external peripherals.

An Exemplary Implementation of a
PCMCIA/IDE/GPIO Combination Host Controller

Figure 6:
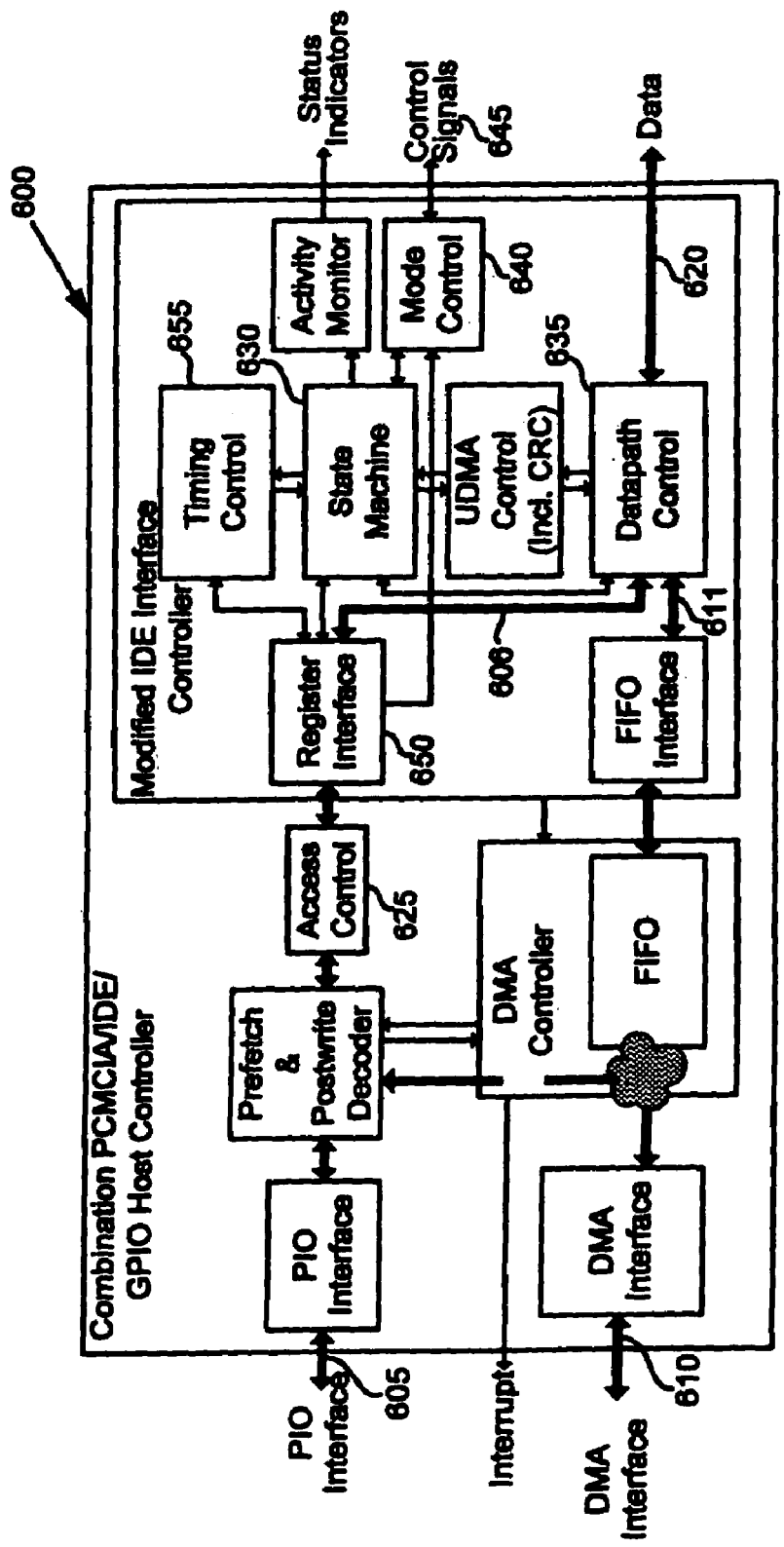
FIG. 6 is a block diagram illustrating an exemplary PCMCLA/IDE/GPIO protocol-shared host controller at least capable of conducting IDE-DMA and PIO (e.g., PCMCIA and GPIO) data-related communications and PIO control-related communications with a plurality of external devices over a control path and a data path shared between a plurality of protocols (e.g., IDE, PCMCIA and GPIO).

The controller 500 of FIG. 5 integrates host IDE, PCMCIA and GPIO functions into one core. IDE and PCMCIA transactions may overlap, and these potentially overlapping accesses will be arbitrated. FIG. 6 shows one exemplary implementation of a combination PCMCI/IDE/GPIO host controller 600, wherein such overlapping communications are interlaced over time without the loss of any information. For instance, in one implementation, when transactions overlap, PCMCIA is given access priority. If an IDE-DMA transaction is in progress when a PCMCIA or GPIO access request is received, the IDE-DMA transfer will be paused, the PCMCIA/GPIO access will occur, and the IDE-DMA transfer will then resume.

Figure 7:
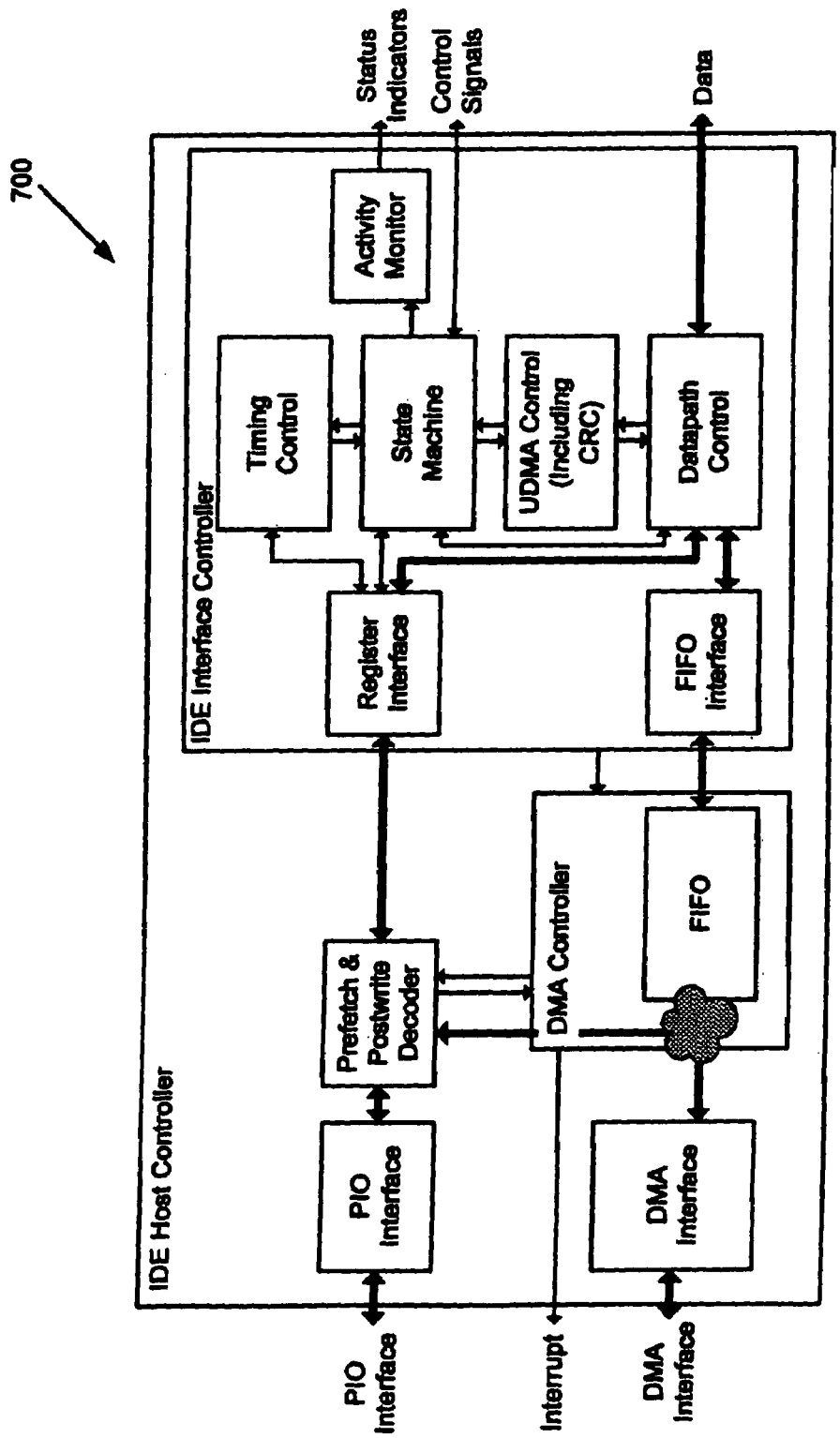
FIG. 7 is a block diagram illustrating an exemplary protocol-specific host controller for conducting computer system communication in IDE protocol.

As shown in FIG. 6, the combination PCMCIA/IDE/GPIO host controller 600 is implemented by modifying an IDE host controller (e.g., 700 of FIG. 7). A comparison of the FIGS. 6 and 7 will lead one to the needed modifications including additional modules needed to implement the PCMCIA/IDE/GPIO combination host controller 600 of FIG. 6.

The combination PCMCIA/IDE/GPIO host controller 600 is capable of receiving PIO communication 605 comprising both data and control signals, as well as IDE-DMA communication 610 comprising data signals. The communication paths through which at least some data-related signals (as opposed to control signals) are transmitted are indicated in FIG. 6 by thicker lines (e.g., at 606 and 611). As shown in FIG. 6, PIO data in PCMCIA protocol, for instance, travels via a first data path at 606 whereas IDE-DMA data travels via a second data path 611. However, in order to reduce the pins needed to implement the combination controller 600, the PIO and the IDE-DMA data-related communication with external devices is conducted via a shared data path 620.

However, as noted above, PIO 606 and IDE-DMA 611 data transfers may overlap in time. Therefore, as shown in FIG. 6, an access control module 625 is provided to decode the type of protocol used in a particular PIO communication. The state machine 630, which is communicative with the access control module 625, can then learn of the type of protocol of a particular PIO communication from the access control module 625 and if the communication comprises a data-related communication in PCMCIA or GPIO protocols, then the state machine 630 causes an ongoing IDE-DMA transfer via the shared data path 620 to be paused in order to allow the PIO (e.g., PCMCIA or GPIO) data transfer to be completed. Upon completion of the PIO data transfer, the previously paused IDE-DMA data transfer can be resumed. The IDE-DMA transfer interruption can be implemented in a number of different ways. For instance, methods for pausing Data-In burst and a Data-Out burst transfers described in the ultra DMA specification can be used.

Although the state machine 630 is programmed to orchestrate the arbitration for the shared data path 620, as described above, a datapath control module 635 is provided to multiplex the multiple types of data transfers over the shared data path 620 according to instructions received from the state machine 630. In this manner, the shared data path 620 comprising shared data pins can be used to reduce the number of pins needed to conduct data transfer in multiple protocols.

In addition to data transfers, the combination PCMCIA/IDE/GPIO host controller is also capable of conducting control-related communication with external devices. As shown in FIG. 5, at least some of the shared pins 555 are used for conducting at least some of the control-related communication 645 in the various protocols (e.g., PCMCIA, GPIO, and IDE). The mode control module at 640 configures and drives the control signals 645 appropriately between selected external devices in accordance with corresponding communication protocols in which the devices communicate. The mode control module 640 receives register information, timing information, and other instructions from the state machine 630 and based on the type of protocol in which a current control-related communication is based, the mode control module 640 appropriately configures and conducts the control signal communication 645 to the appropriate registers of the external device.

In this embodiment of FIG. 6, a current transmission of a control-related signal 645 of one protocol type that is initiated through the PIO Interface 605 is not interrupted in order to allow another control-related signal 645 that is also initiated through the PIO Interface 605, because both these PIO based control-related signals 645 originate from the host processor and, thus, the signals are simply transmitted in the order they are received.

In addition to access control module 625, the state machine 630, register interface 650 and the mode control module 640, a timing control sub-module 655 is provided to control proper timing of address, data, and control signals on the various interfaces using the timing information provided in the timing configuration registers. Each protocol type has independent timing controls. The IDE, PCMCIA and GPIO interfaces support a wait signal from the device to extend read/write cycles. Independent timers monitor the assertion length of the wait signal accesses, and generate an interrupt to the processor on timeout to prevent system hang.

Figure 8:
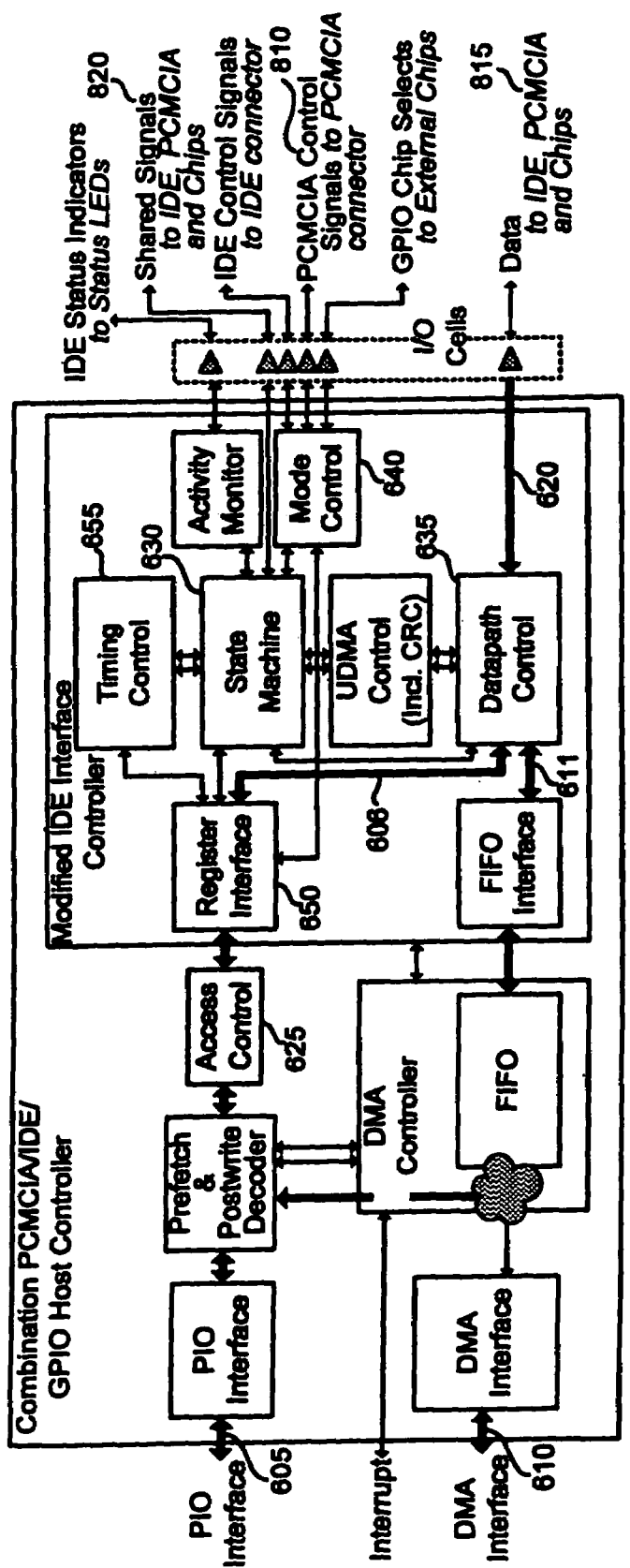
FIG. 8 is a block diagram illustrating the exemplary PCMCIA/IDE/GPIO protocol-shared host controller of FIG. 6, including I/O cells illustrating control and data signal paths shared between multiple protocols.

FIG. 8 illustrates the exemplary implementation of a combined PCMCIA/IDE/GPIO host controller with I/O indicating the various protocol-specific control signals and their corresponding pins at 810 (e.g., for IDE PCMCIA and GPIO protocol connectors) and the shared control signals at 820. Furthermore, the combination PCMCI/ADE/GPIO host controller in FIG. 8 illustrates a shared data path at 815 for interleaving data-related communication in multiple protocols (e.g., PCMCIA, IDE, and GPIO).

In FIGS. 6 and 8, the various functionalities implemented in the various modules can be consolidated into one module or can be variously redistributed to suit the needs of a particular system design. For instance, the functionalities of the mode control module 640 can be combined within the state machine 630.

An Exemplary Set of Shared Controller Interface Pins

In one exemplary combination PCMCIA/GPIO/IDE host controller core, as shown in FIG. 5, data and control pins are shared for communications in PCMCIA, IDE, and GPIO protocols, as listed below in Table 1.

TABLE 1

| Pin Name | Type | No. | Pin Description |
|---|---|---|---|
| hd_in(15:0) | I | 16 | Host read data bus to HD I/O buffers |
| iordy | I | 1 | I/O Ready signal used by device to extend GPIO and IDE-PIO data transfer cycles. Note: This is not used for PCMCIA; refer to following section for more information |
| hd_out(15:0) | O | 16 | Host write data bus from HD I/O buffers |
| hdlo_oe_n | O | 1 | Host Data Low (7:0) Output Enable low active |
| hdhi_oe_n | O | 1 | Host Data High (15:8) Output Enable active low |
| hiown | O | 1 | Host I/O Write strobe |
| hiorn | O | 1 | Host I/O Read strobe |
| ha(25:0) | O | 3 | Host Address (bits 2:0 only used for IDE) |
| Total | | 40 | |

Thus, in this exemplary implementation, up to 40 pins may be shared between three different protocol types. These pins otherwise would have to be provided in each different protocol-specific host controller resulting in unnecessary resource costs.

Figure 9:
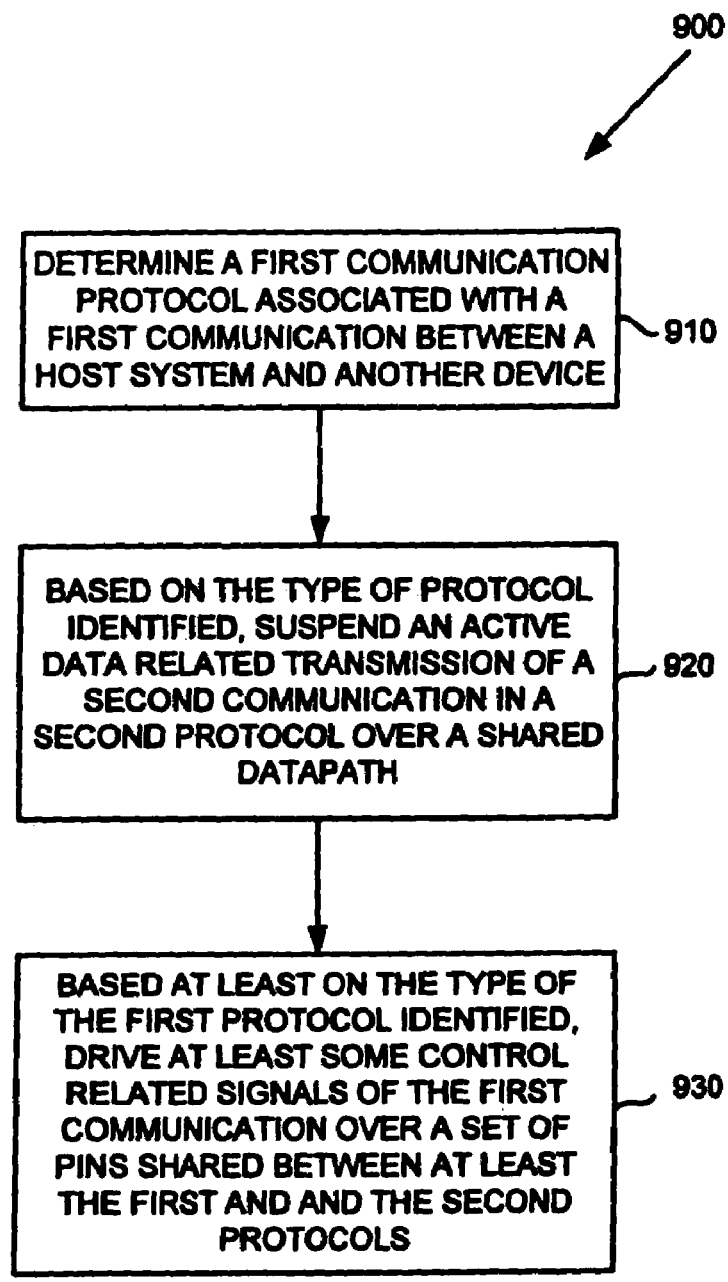
FIG. 9 is a flow diagram describing an exemplary method of conducting computer system communication in a protocol-shared combination host controller adaptable to conduct computer system communication in multiple communication protocols with multiple devices over at least one control path and/or at least one data path shared between at least some of the multiple communication protocols.

An Exemplary Method of Conducting Communication Between a Computer System and Multiple External Devices in Multiple Protocols Across Shared Control Paths and Data Paths Once a combination host controller is configured, as shown with respect to FIGS. 6 and 8, for instance, communications in multiple protocols corresponding to multiple external devices can be conducted. FIG. 9 illustrates one such method 900. At 910, the exemplary host controller determines the type of protocol associated with a first communication between a host system and another device, such as an external memory device or another system. Then at 920, based at least in part on the type of protocol identified above, a combination controller can suspend an active data transfer related to a second communication being conducted over a shared data path to allow the data transfer related to the first communication to be completed. Also, at 930, based at least on the type of protocol related to the first communication, the host controller drives at least some of the control-related signals of the first communication over at least one pin shared for conducting a control signal in a number of different protocols. In this manner, the data-related signals of a first and second communication are interleaved over a shared data path and also, at least some control-related communication is conducted via shared control pins. Conducting communication via protocol-shared control pins and data pins allows for a reduction in the number of pins needed to implement a host controller capable of conducting communication in a plurality of communication protocols.

Having described and illustrated the principles of our invention with reference to the illustrated embodiments, it will be recognized that the illustrated embodiments can be modified in arrangement and detail without departing from such principles. For instance, as noted above, the technologies from any example can be combined with the technologies described in any one or more of the other examples.

Furthermore, various components of systems and tools described herein may be combined in function and use. Thus, the division of functionalities amongst the various modules above can be varied without departing from the core principles. Also, many of the exemplary embodiments described above rely on selected communication protocols. However, the principles of implementing a combination host controller is not limited by the exemplary protocols discussed above.

Additionally, elements of the illustrated embodiment shown in software may be implemented in hardware and vice versa. Also, the described hardware can be implemented as software representation of hardware in a hardware description language, such as Verilog or VHDL, for instance. The following claims cover actual hardware implementation, as well as software representations of actual hardware.

Also, many of the examples above refer to communication between a system and devices external to the system. Such communication refers to transmissions to and from the system and likewise to and from the external devices. External devices include, but are not limited to, I/O devices, such as keyboards or mice, memory devices, such as hard drives or flash memory, and external devices also include other systems, such as another SOC.

In view of the many possible embodiments to which the principles of the invention may be applied, it should be recognized that the illustrated embodiments are examples of the invention and should not be taken as a limitation on the scope of the invention. We therefore claim as our invention all subject matter that comes within the scope and spirit of these claims.

We claim:

1. A method of conducting communication between a host processor of a system on chip and a plurality of external devices wherein the communication comprises a plurality of signals in a plurality of protocols, the method comprising:
   determining a first protocol associated with a first signal;
   based at least on the determining of the first protocol, suspending an active data-related transmission of a second signal being conducted in a second protocol over a shared data path to allow for a data-related transmission of the first signal over the shared data path;
   based at least on the first protocol, configuring and driving at least some of the control-related transmissions of the first signal via a protocol-specific group of control pins; and
   configuring and driving at least some of the control-related transmissions of the first signal via a protocol-shared group of control pins capable of conducting control-related signals related to at least some of the plurality of protocols.

2. The method of claim 1 comprising restoring the suspended data-related transmission of the second signal upon completing the data-related transmission of the first signal.

3. The method of claim 1, the first signal is a PIO related access, the first protocol is a PCMCIA protocol, the second signal is a DMA related access, and the second protocol is a parallel ATA protocol.

4. The method of claim 3, the protocol-shared group of control pins comprises I/O ready, Host data low, Host data high, Host I/O write strobe, Host I/O read strobe, and Host address bits.

5. The method of claim 3, the shared data path comprises pins for Host read data bus to HD I/O and Host write data bus to HD I/O.

6. The method of claim 1, the first signal is a PIO related access, the first protocol is a GPIO protocol, the second signal is a DMA related access, and the second protocol is a parallel ATA protocol.

7. The method of claim 6, the protocol-shared group of control pins comprises I/O ready, Host data low, Host data high, Host I/O write strobe, Host I/O read strobe and Host address bits.

8. The method of claim 6, the shared data path comprises pins for Host read data bus to HD I/O and Host write data bus to HD I/O.

* * * * *